(12) United States Patent
Komatsu et al.

(10) Patent No.: US 6,442,990 B1
(45) Date of Patent: Sep. 3, 2002

(54) METHOD OF MANUFACTURING A PLATE-SHAPED MEMBER HAVING A RECESS AND PRESS DIE FOR FORMING RECESSES

(75) Inventors: Hiroyuki Komatsu; Yoshihisa Nagamine; Akira Takahashi, all of Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 3 days.

(21) Appl. No.: 09/684,018

(22) Filed: Oct. 6, 2000

(30) Foreign Application Priority Data

Oct. 8, 1999  (JP) .............................. 11-287455
Oct. 3, 2000  (JP) ........................... 2000-304093

(51) Int. Cl.[7] .............................................. B21D 28/00
(52) U.S. Cl. ........................... 72/334; 72/340; 257/704
(58) Field of Search ...................... 72/334, 340, 341, 72/358, 356, 325, 326, 327; 257/704, 702, 678; 29/841

(56) References Cited

U.S. PATENT DOCUMENTS

| | | | | |
|---|---|---|---|---|
| 1,005,980 A | * | 10/1911 | Katzinger ..................... | 72/358 |
| 1,082,910 A | * | 12/1913 | Rockwell ..................... | 72/358 |
| 2,697,953 A | * | 12/1954 | Chapman ..................... | 72/356 |
| 2,814,863 A | * | 12/1957 | Nagel ........................... | 72/332 |
| 4,245,491 A | * | 1/1981 | Kondo et al. ................. | 72/254 |
| 4,604,495 A | * | 8/1986 | Watanabe ................... | 174/52.4 |
| 5,273,385 A | * | 12/1993 | Rose et al. .................. | 411/501 |
| 5,996,390 A | * | 12/1999 | Tsujikawa et al. ............ | 72/335 |
| 6,145,365 A | * | 11/2000 | Miyahara ..................... | 72/324 |
| 6,155,093 A | * | 12/2000 | Lipari .......................... | 72/254 |

FOREIGN PATENT DOCUMENTS

| | | |
|---|---|---|
| JP | A-11-195721 | 7/1999 |
| JP | A-2000-42642 | 2/2000 |

* cited by examiner

*Primary Examiner*—Daniel C. Crane
(74) *Attorney, Agent, or Firm*—Paul & Paul

(57) ABSTRACT

A plate-shaped member having a recess useful for an electronic part and particularly for a heat dissipation plate for a semiconductor element, the inside and outside of which member are flat. The plate-shaped member has a recess defined by a bottom wall portion and a side wall portion extending from a peripheral end of the bottom wall portion formed without bending a metallic plate, by press forming. The upper and lower surfaces of the side wall and the bottom wall are formed in parallel and flat, and the thickness of the bottom wall is smaller than the thickness of the metallic plate and, further, the thickness, between the upper surface and the lower surface, of the side wall is larger than the thickness of the metallic plate.

9 Claims, 12 Drawing Sheets

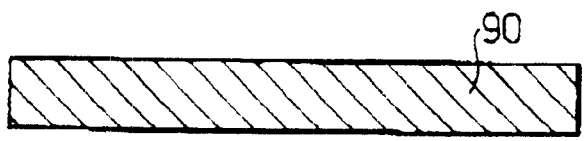
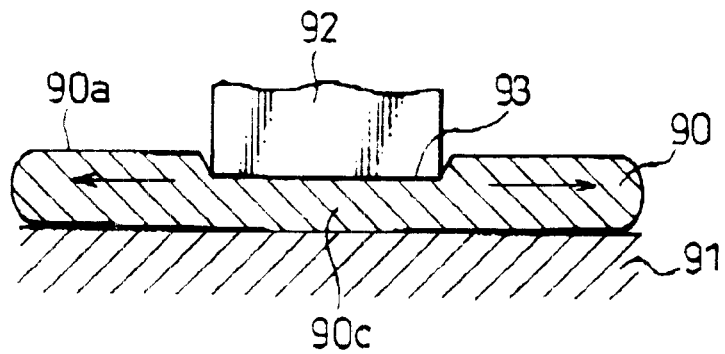
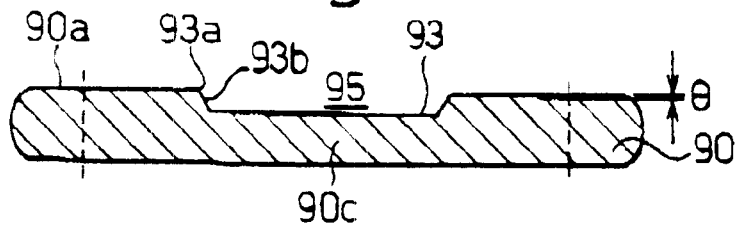
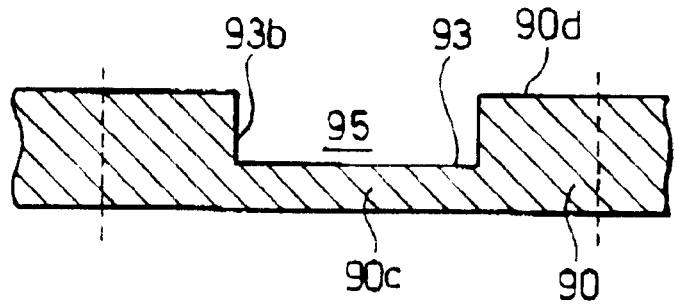

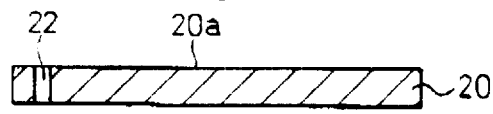
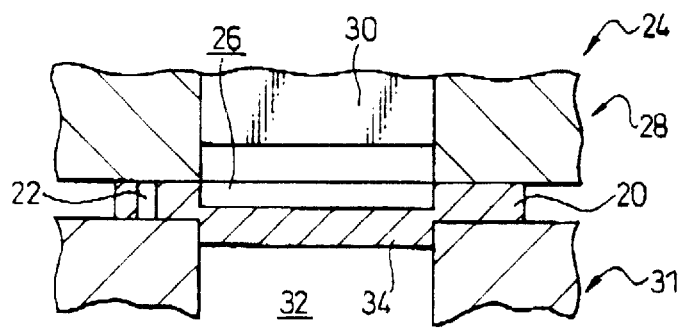
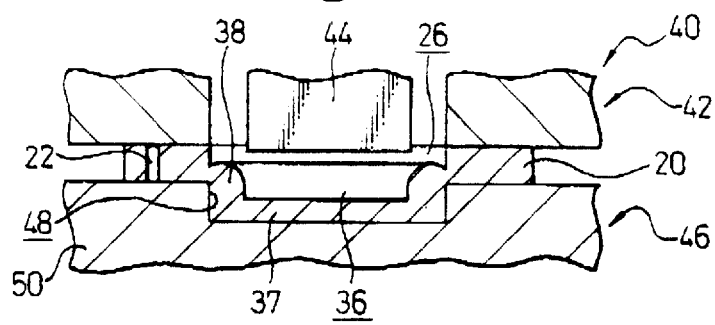
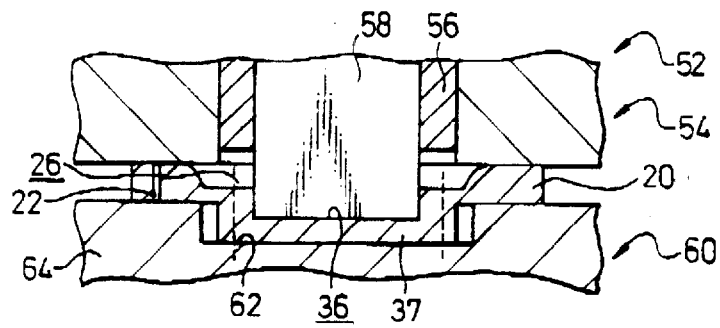

Fig.8
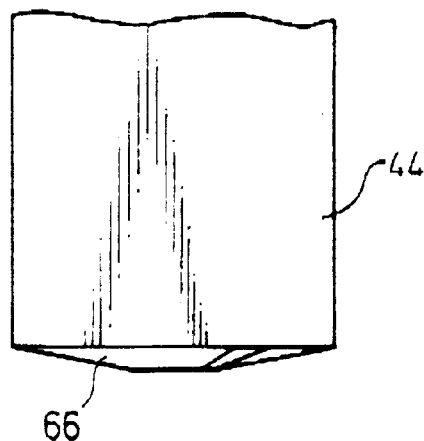
Fig.9
(a) 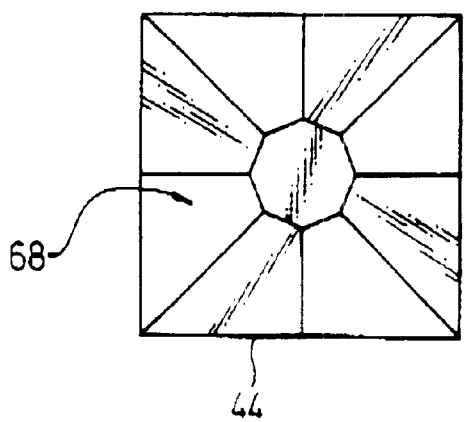 (b) 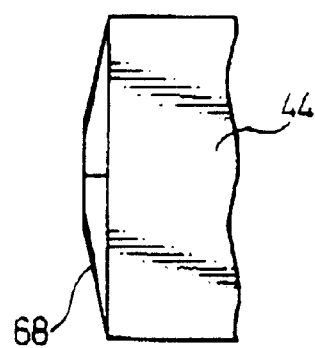

METHOD OF MANUFACTURING A PLATE-SHAPED MEMBER HAVING A RECESS AND PRESS DIE FOR FORMING RECESSES

BACKGROUND OF THE INVENTION

1. Field of the Invention

The present invention relates to a plate-shaped member having a recess, a method of manufacturing the plate-shaped member, and a press die for forming the recess. More particularly, the present invention relates to a plate-shaped member having a recess for electronic parts which recess is formed without bending a metallic plate, a method of manufacturing such plate-shaped member, and a press die, for forming the recess, having a punch for forming the recess on the metallic plate by means of press forming and a die, on which the metallic plate is put, arranged opposed to the punch.

2. Description of the Related Art

As illustrated in FIG. 19, which is referred to hereinafter to explain a semiconductor device to which the present invention can be applied, a semiconductor device containing a cap-shaped heat dissipation plate adhered to semiconductor element is mounted on a circuit board.

Not only the semiconductor device but also other various electronic parts such as a chip capacitor can be mounted on the circuit board. Therefore, the upper surface and lower surface of the heat dissipation plate, the profile of which is formed into a cup-shape, must be flat.

Generally, the cap-shaped heat dissipation plate has been produced from a metallic plate by press forming the metallic plate. The press forming, as disclosed in the "prior art" section of Japanese Unexamined Patent Publication (Kokai) No. 2000-42642 and shown in FIGS. 1A to 1C of this application for reference, comprises the steps of providing a metallic plate 90 as a raw material as shown in FIG. 1A, and then placing the metallic plate 90 on a die 91 of the pressing machine, followed by pressing the metallic plate 90 from a side of the surface 90a of the plate 90 with a pressing punch 92 as shown in FIG. 1B. As a result, as is shown in FIG. 1C, a recess 93 is formed on the surface 90a of the plate 90. Further, a bottom portion 90c having the predetermined thickness is formed in a bottom surface of the recess 93. A semiconductor element (not shown) is contained in a space 95 formed by the recess 93.

In the press forming illustrated in FIGS. 1A to 1C, a material of the recess 93 can move, in the direction of the arrows shown in FIG. 1B, in the metallic plate 90 during pressing the plate 90 with the punch 92. Thus, as is shown in FIG. 1C, a rounded corner part 93a is produced as a result of sagging of the material in the opening ends of the recess 93, along with the formation of a tapered inner wall 93b. Further, the metallic plate 90 is warped, because the outer ends are lifted at an angle θ due to the stress applied to the plate 90 by the punch 92.

Due to the above problems, it is difficult for the prior art press forming method to ensure that the inside and outside of the heat dissipation plate are formed completely flat. Note that Japanese Kokai NO. 2000-42642 teaches a method for forming a recess, in a metallic plate, with a recess having a perpendicular inner wall. However, it is still difficult to produce a heat dissipation plate having completely flat inside and outside surfaces.

To avoid the above problems, there has been suggested a cutting method, in place of the press forming method, in the formation of the cap-shaped heat dissipation plate. That is, as illustrated in FIG. 2, a metallic plate 90 is cut to form a recess 93 which defines a space 95 for receiving a semiconductor element or other part (not shown), followed by cutting off the unnecessary end portions at the cutting line, shown by a dotted line in the drawing, to obtain a cap-shaped heat dissipation plate having the predetermined configuration and size. As illustrated, the recess 93 has a perpendicular inner wall 93b, along with a bottom portion 90c with a predetermined thickness.

When the recess is formed in the metallic plate by cutting as described above, the inside and outside of the finally obtained cap-shaped heat dissipation plate can be made flat. Note, however, work time necessary for the process of forming the heat dissipation plate is mainly determined by the process of forming the recess on the metallic plate by means of cutting and it is very difficult to enhance the cutting speed.

Further, in order to form the cap-shaped heat dissipation plate by cutting, it is necessary to provide a metallic plate, the thickness of which is at least the same as the thickness between the upper end and the lower end of the side wall 90d which defines the heat dissipation plate. In order to satisfy this requirement, it is generally necessary to use a metallic plate, the thickness of which is much larger than the thickness of the side wall 90d, thus the material cost is increased.

If it were possible to produce the cup-shaped heat dissipation plate by using press forming, the speed of producing the heat dissipation plate could be remarkably increased, and further a metallic plate could be used which is thinner than a metallic plate used in the production of the cap-shaped heat dissipation plate by cutting.

SUMMARY OF THE INVENTION

The present invention is directed to solve the prior art problems discussed above.

One object of the present invention is to provide a plate-shaped member, having a recess, the inside and outside of which are formed as flat as possible by using press forming, particularly useful for electronic parts.

Another object of the present invention is to provide an improved method of manufacturing the plate-shaped member, having a recess, by press forming.

Still another object of the present invention is to provide a press die for forming recesses which is useful in the production of the plate-shaped member, having a recess, from a metallic plate.

The above objects and other objects of the present invention will be easily understood from the following detailed description of the present invention.

The present inventors have made investigation into the above problems, and as a result, they have found the following facts and accomplished the present invention. That is, if the fabrication is conducted on a metallic plate to form a first recess and, on the bottom face of the thus formed first recess, a second recess is formed by punching, while metal extruded by punching at this time is protruded in such a manner that a bottom portion of the first recess between the first and the second recess is protruded to form a protuberance portion, followed by making an upper face of this protuberance portion flat, the thickness, between the upper end and the lower end, of the side wall of the produced recess can be made larger than the thickness of the metallic plate on which press forming is applied.

In one aspect thereof, the present invention provides a plate-shaped member having a recess, defined by a bottom wall portion and a side wall portion extending from a peripheral end of the bottom wall portion, formed by press forming a metallic plate without bending the same, characterized in that an upper surface and lower surface of the side wall portion and bottom wall portion each has a flat and parallel surface, the thickness of the bottom wall portion is smaller than the thickness of the metallic plate (before press forming), and the thickness, between an upper end surface and a lower end surface, of the side wall portion is larger than the thickness of the metallic plate (before press forming).

The plate-shaped members with recesses according to the present invention can be advantageously used for a variety of parts based on the flat inside and outside of the recesses, preferably as electronic parts, more preferably as a cap-shaped heat dissipation plates for semiconductor elements in semiconductor devices.

Further, in another aspect thereof, the present invention provides a method of manufacturing a plate-shaped member having a recess, defined by a bottom wall portion and a side wall portion extending from a peripheral end of the bottom wall portion, by press forming a metallic plate without bending the same, comprising the steps of:

forming a first recess in a metallic plate, the opening area of which is larger than the opening area of the recess, by fabricating the metallic plate with a first punch;

forming a second recess in a bottom wall portion of the first recess by using a press die comprising a second punch, the cross-sectional area of which is equal to the opening area of the recess, and a die having, on a face opposed to a forward end face of the second punch, a recess into which a protruding portion of the metallic plate produced by the formation of the first recess is inserted, while forming a protuberance portion in such a manner that the thickness of the bottom wall portion of the second recess is made to be smaller than the thickness of the bottom wall portion of the first recess, and the bottom wall portion of the first recess, between the first and the second recesses, is protruded so that the thickness between the upper surface and the lower surface of the protuberance portion can be larger than the thickness of the metallic plate;

forming an upper surface of the protuberance portion into a flat surface while retaining the flatness of the upper surface and lower surface of the side wall portion and the bottom wall portion defining the second recess and the thickness between the upper surface and the lower surface, of the protuberance portion which is larger than the thickness of the metallic plate; and cutting the protuberance section to a predetermined width.

In the manufacturing process of the plate-shaped member according to the present invention, it is preferred that a side wall portion of the recess is formed after a flat upper surface was formed in the protuberance section in the cutting step.

Furthermore, in another aspect thereof, the present invention provides a press die for forming a recess in a metallic plate for the production of a plate-shaped member having a recess, the recess being defined by a bottom wall portion and a side wall portion extending from a peripheral end of the bottom wall portion, which press die comprises a punch for forming a recess on the metallic plate by press forming, and a die opposed to the punch, on which die the metallic plate is put, and in which press die, at least one of the forward end face of the punch and the opposed face of the die opposed to the forward end face of the punch has a protruding section of cone, truncated cone, polygonal pyramid, truncated polygonal pyramid, hemisphere or truncated hemisphere.

The present invention can be preferably applied to the production of electronic parts, particularly heat dissipation plates, for semiconductor elements. In the production of the plate-shaped member having a recess, when the absorbing section such as a slit for absorbing an elongation created on the work face of the metallic plate during the press forming is formed close to a portion to be press-formed on the metallic plate before the formation of the first recess, distortion and deformation of the profile of the resulting recess can be prevented.

Further, according to the present invention, on the bottom wall of the first recess formed by press shaping of the metallic plate, the second recess is further formed by punching, and, at the same time, metal extruded by punching is absorbed when the bottom wall of the first recess between the first and the second recesses is protruded. Therefore, it is possible to form a protuberance section in which the thickness between the upper and lower surfaces is larger than the thickness of the metallic plate (before press forming). Therefore, when the upper surface of this protuberance section is made flat while the thickness between the upper and lower surfaces of the protuberance section is being kept larger than the thickness of the metallic plate (before press forming), the thickness between the upper and lower end surfaces of the side wall section of the recess can be formed larger than the thickness of the metallic plate (before press forming).

Furthermore, since the upper surface of the protuberance section is made flat while the inside and the outside of the second recess are being kept flat, the side wall and the bottom wall of the recess formed in the finally obtained plate-shaped member can be formed flat.

BRIEF DESCRIPTION OF THE DRAWINGS

FIGS. 1A to 1C are cross-sectional views, illustrating the production process, in sequence, of the cap-shaped heat dissipation plate according to the prior art press forming method;

FIG. 2 is a cross-sectional view illustrating the production process of the cap-shaped heat dissipation plate according to the prior art cutting method;

FIGS. 4A to 4D are cross-sectional views illustrating, in sequence, one embodiment of the manufacturing process of the heat dissipation plate shown in FIGS. 3A to 3C;

FIG. 8 is a partial side view illustrating an example of the punch used to solve the problem shown in FIG. 7;

FIG. 9 is a front view (a) and a partial side view (b) illustrating another example of the punch used to solve the problem shown in FIG. 7;

DESCRIPTION OF THE PREFERRED EMBODIMENTS

Figure 3A:
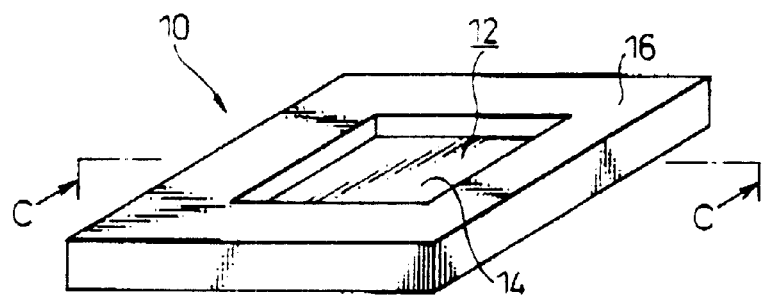
FIG. 3A is a perspective view of the cap-shaped heat dissipation plate, which is an example of the electronic parts, produced in press forming according to the present invention.

The present invention will be further described with regard to the preferred embodiments thereof, referring to the appended drawings. Note in the drawings that, if two or more figures (for example, FIGS. 3A to 3C) are related to each other, the term "FIG. 3" will be used to briefly refer to all of FIGS. 3A to 3C.

Figure 3B:
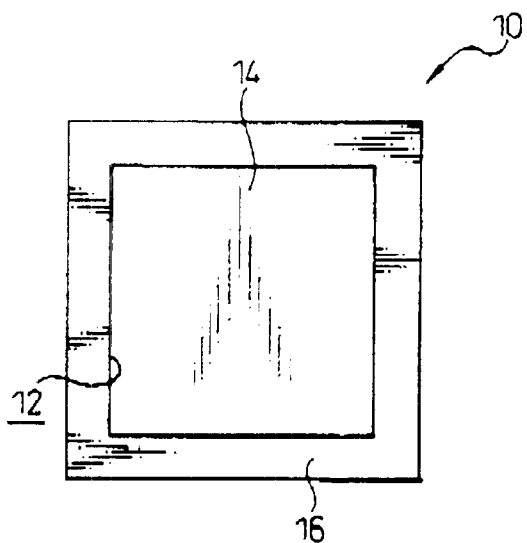
FIG. 3B is a front view of the cap-shaped heat dissipation plate of FIG. 3A.
Figure 3C:
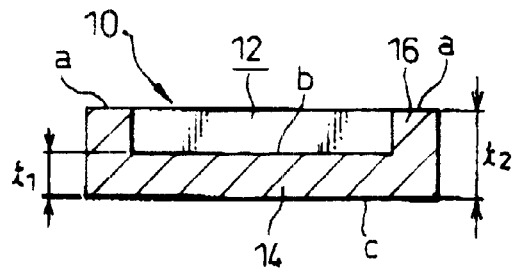
FIG. 3C is a cross-sectional view, taken along line C—C, of the cap-shaped heat dissipation plate of FIG. 3A.

As an example of the plate-shaped member having a recess according to the present invention, a cap-shaped heat dissipation plate 10 used in the semiconductor device is illustrated in FIGS. 3A to 3C, in which FIG. 3A is a perspective view of the heat dissipation plate 10, FIG. 3B is a front view of the heat dissipation plate 10, and FIG. 3C is a cross-sectional view taken along line C—C of FIG. 3A.

The heat dissipation plate 10 shown in FIG. 3 has, applied on a surface thereof, a recess 12 which is formed without bending a metallic plate by press forming. The recess 12 is defined by a bottom wall 14 and a side wall 16 extending from a peripheral end of the bottom wall 14. The inside and outside of this recess 12 are formed flat, that is, an upper surface and lower surface of the bottom wall 14 and side wall 16 are flat and parallel to each other, and thickness $t_1$ of the bottom wall 14 of the recess 12 is smaller than that of the metallic plate (before press forming), and the thickness $t_2$, between the upper end surface and the lower end surface, of the side wall 16 of the recess 12 is larger than that of the metallic plate (before press forming). With regard to the flatness of the surfaces, it is particularly preferred that both of an upper surface "a" of the side wall 16 and an upper surface "b" of the bottom wall 14 have a high level of the flatness, and it is also desired that a lower surface "c" of the bottom wall 14 is flat.

Although not shown in the drawing, when a through-hole is formed on a suitable site of the bottom wall 14, air can move into and out of the recess 12 via the through-hole in the case where the heat dissipation plate 10 to which the semiconductor element is made to adhere is mounted on a circuit board or in the case where the inside temperature of the heat dissipation plate 10 is changed at a later stage.

The heat dissipation plate 10 is generally produced by using, as a starting material, a plate of a metal such as copper and its alloys, stainless steel, and aluminum and its alloys. Of course, any other metallic plate may be used in the production of the heat dissipation plate or other plate-shaped members, if desired. Further, a configuration and size of the heat dissipation plate 10 may be varied depending upon site to which the plate is mounted or the use of the plate, for example. Generally, it is preferred that the heat dissipation plate 10 has the configuration illustrated in FIG. 3 (3A to 3C), along with the length and width of the plate of about 20 to 40 mm, the thickness ($t_2$) of the plate of about 1.5 to 2.5 mm and the depth ($t_2-t_1$) of the recess of about 0.4 to 0.7 mm.

The heat dissipation plate 10 of FIG. 3 can be preferably produced in accordance with the press forming method illustrated, in sequence, in FIG. 4, i.e., FIGS. 4A to 4D, and FIG. 5.

First, after a metallic plate 20 was prepared, as shown in FIG. 4A, a slit 22 is formed close to a site of the metallic plate 20 to be press-formed. The slit 22 can act as an absorbing section for absorbing an elongation, which will be referred to as an "elongation in the horizontal direction" hereinafter, created on the work face 20a of the metallic plate 20 during press forming.

Next, as shown in FIG. 4B, a first recess 26, the area of which is larger than the opening area of the recess 12 of the heat dissipation plate 10, is formed on the metallic plate 20, by press shaping the metallic plate 20. A protruding section protruding onto the face side opposite to the opening face side of the first recess 26 is formed upon forming the first recess 26, and it is also referred to as the bottom wall 34 of the first recess 26. In this press shaping process, the thickness of the bottom wall 34 of the first recess 26 is substantially the same as that of the metallic plate 20.

The press shaping process can be preferably carried out by using the first press die 24 shown in FIG. 4B. In the upper die 28 of this first press die 24, there is provided a first punch 30, the cross section of which is formed rectangular so that the first punch 30 can form the first recess 26. In the lower die 31, there is provided a die 31 in which the insertion hole 32 is formed, into which the forward end portion of the first punch 30 of the upper die 28 is inserted to conduct the intended fabrication on the metallic plate 20 when the upper die 28 and the lower die 31 are closed to each other. The periphery of the metallic plate 20 which forms the first recess 26 is interposed between parting faces of the upper die 28 and the lower die 31 when the first press die 24 is closed.

Thereafter, on the bottom wall 34 of the first recess 26 formed on the metallic plate 20, as shown in FIG. 4C, the second recess 36 is formed, the traverse cross section area of which is the same as the opening area of the recess 12 of the heat dissipation plate 10. When the thickness of the bottom wall 37 of the second recess 36 is made smaller than thickness of the bottom wall 34 of the first recess 26, the excluded metal of the bottom wall 34 is moved onto the bottom wall 34 of the first recess 26 between the first recess 26 and the second recess 36, so that a protuberance section 38 is formed. The thickness of the thus formed protuberance section 38 can be made larger than the thickness of the metallic plate 20 (before press forming). During the formation of the second recess 36, the metallic plate 20 is elongated in the horizontal direction. This elongation in the horizontal direction can be absorbed by reducing the width of the slit 22.

The formation of the second recess 36 can be preferably carried out by using the second press die 40 shown in FIG. 4C. In the upper die 42 of the second press die 40, there is provided a second punch 44, the traverse cross section area of which is the same as the opening area of the recess 12 of the heat dissipation plate 10, and the traverse cross section of which is rectangular. In the lower die 46, on the face opposed to the forward end face of the second punch 44, there is provided a die 50 having a recess 48, into which the bottom wall 34 of the first recess 26, that is, a protruding section of the metallic plate 20 protruding onto the side opposite to the opening face side of the first recess 26, is inserted. As in the above-described first press die 24, the periphery of the metallic plate 20 which forms the first recess 26 is interposed between the parting faces of the upper die 42 and the lower die 46 when the second press die 40 is closed.

The illustrated heat dissipation plate 10 is preferably produced by conducting, in sequence, the steps of FIGS. 4A to 4C. If the process shown in FIG. 4B is omitted and the metallic plate 20 shown in FIG. 4A is subjected to the process shown in FIG. 4C so that the second recess 36 is formed on the metallic plate 20 by the second press die 40 illustrated in FIG. 4C, it is impossible to make the outside of the second recess 36 flat as the outside corner section of the second recess 36 is curved.

However, according to the present invention, since the first recess 26 is previously formed on the metallic plate 20 by press shaping, not only the inside of the second recess 36 formed by the punch 44 but also its outside can be made flat. Further, the inside corner section and the outside corner section of the second recess 36 can be formed into a right angle.

After the metallic plate 20 having the protuberance section 38 was formed as mentioned above, the protuberance section 38 is subjected to the flattening process. The flattening process is preferably carried out by using the third press die 52 shown in FIG. 4D in such a manner that the upper face of the protuberance section 38 is pressed to form a flat face while the inside and the outside of the second recess 36 are kept flat.

In the third press die 52, its upper die 54 includes a cylindrical punch 56 for pressing the curved upper face of the protuberance section 38 so that the curved upper face can be flat; and an inserting body 58, the traverse cross section of which is rectangular, the forward end portion of which is inserted into the second recess 36 so that the inside of the second recess 36 can be kept flat. Further, in the lower die 60 of the third press die 52, there is provided a die 64 having the recess 62 into which the bottom wall 37, which is a protruding portion of the second recess 36, is inserted, wherein this recess 62 is formed on the face opposed to the forward end face of the inserting body 58.

In the process shown in FIG. 4D, while the forward end portion of the inserting body 58 of the upper die 54 is being inserted into the second recess 36, the bottom wall 37 of which is inserted into the recess 62 of the die 64 of the lower die 60 comprising the third press die 52, the curved upper face of the protuberance section 38 is pressed by the forward end face of the cylindrical punch 56, and thus the upper face of the protuberance section 38 can be made flat. In this case, protrusion of the pressed portion of the protuberance section 38 to the inside and/or outside of the second recess 36 can be prevented by the inserting body 58 of the upper die 52 inserted into the second recess 36 and also by the recess 62 of the die 64 provided in the lower die 60 into which the bottom wall 37 of the second recess 36 is inserted. As a result, the inside and outside of the second recess 36 can be made flat.

In the above process, the pressed portion of the protuberance section 38, which is not protruded into the second recess 36 due to insertion of the forward end portion of the inserting body 58 into the second recess 36, can be absorbed by the slit 22 of the metallic plate 20 by reducing the width of the slit 22.

Figure 5:
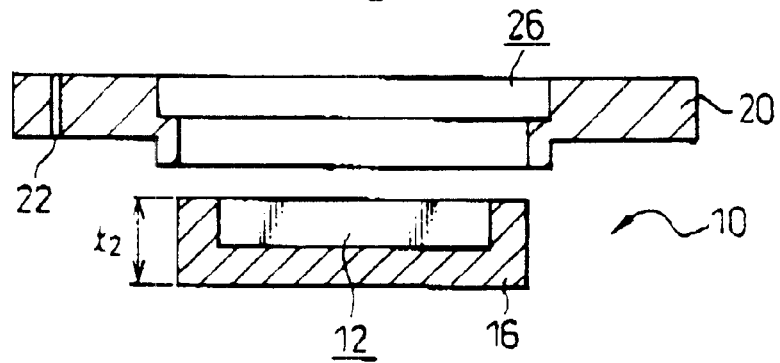
FIG. 5 is a cross-sectional view illustrating the final production process of the heat dissipation plate shown in FIGS. 3A to 3C.

The process of FIG. 5 is carried after the processes described above referring to FIGS. 4A to 4D have been completed. That is, after the upper face of the protuberance section 38 formed between the first recess 26 and the second recess 36 on the metallic plate 20 was made flat, the metallic plate 20 having the first recess 26 can be formed into a cap-shaped heat dissipation plate 10 when the flat face of the protuberance section 38 is cut at the cutting line which is shown with dotted line in FIG. 4D to a predetermined width as shown in FIG. 5.

In the thus formed heat dissipation plate 10, the thickness $t_2$ between the upper end and the lower end of the side wall 16 of the recess 12 can be made larger than that of the metallic plate 20 (before press forming). For the above reasons, the metallic plate 20 having a thickness smaller than the thickness ($t_2$) between the upper end and the lower end of the side wall 16 of the recess 12 can be used for press forming, and thus the manufacturing cost of the heat dissipation plate 10 can be reduced.

The manufacturing process of the heat dissipation plate 10 shown in FIGS. 4A to 4D and FIG. 5 looks troublesome, however, it is very simple in comparison with the above-described manufacturing process using cutting. This is because, as shown in FIGS. 4B to 4D, the first press die 24, second press die 40 and third press die 52 are successively used for press forming of the metallic plate 20 to form the heat dissipation plate 10. Due to the foregoing, productivity of the heat dissipation plate 10 can be remarkably enhanced as compared with the manufacturing process in which the heat dissipation plate 10 is formed by cutting.

Figure 6:
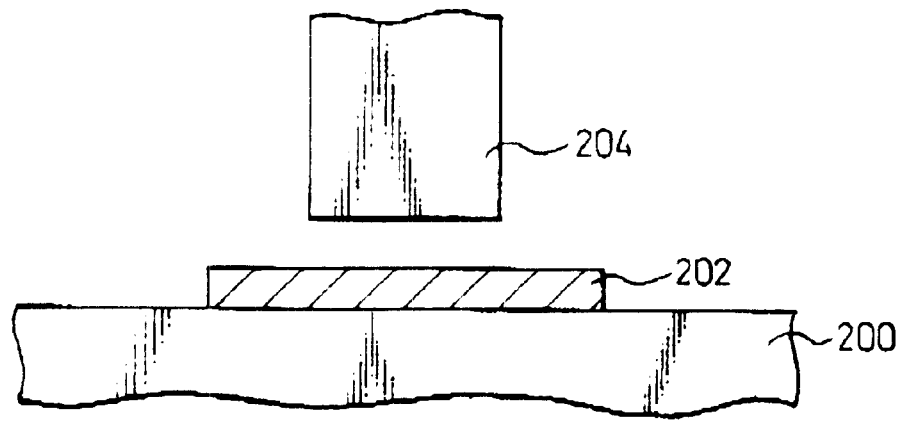
FIG. 6 is a cross-sectional view illustrating a conventional method of forming a recess on a metallic plate by press forming.
Figure 7:
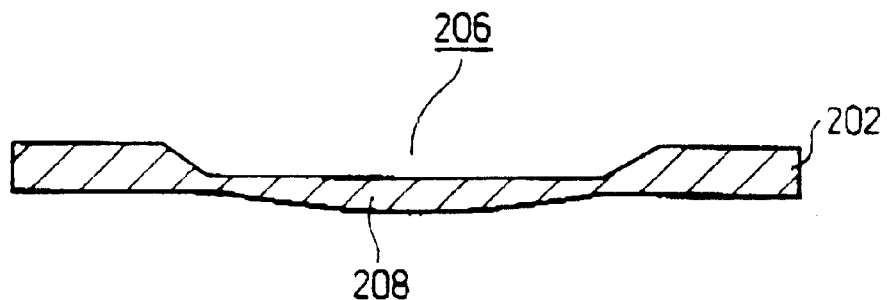
FIG. 7 is a cross-sectional view for explaining a problem caused by the press forming method shown in FIG. 6.

In general, as shown in FIG. 6, in the case where a recess is formed in the metallic plate 202, put on the die 200, by the punch 204, when the forward end faces of both the die 200 and the punch 204 are flat, the protrusion 208 is formed on the reverse side of the metallic plate 202, on which the recess 206 is formed, as shown in FIG. 7, and thus the thickness of the bottom wall of the recess 206 fluctuates.

The fluctuation of thickness in the bottom wall tends to occur when the opening area of the recess 206 is increased. It can be estimated that this fluctuation of thickness occurs as follows. When the recess 206 is formed by the punch 204, a portion of the metallic plate 202 close to the center of the recess 206, which has been excluded by the forward end of the punch 204, cannot be sufficiently moved in the horizontal direction and protruded onto the reverse side of the metallic plate 202.

Similarly, since the opening area of the recess 12 (see, FIG. 3) of the heat dissipation plate 10 is large, there is a possibility that thickness of the bottom wall 14 of the recess 12 fluctuates when the recess 12 is formed. Therefore, it is preferable that the forward end face of the press die used in the formation of the recess 12, i.e., the punch 44 provided in the second press die 40 shown in FIG. 4C, is formed into a protruding section, the central portion of which is protruded. The profile of the protruding section is not limited to, but preferably includes a cone, a truncated cone, a polygonal pyramid, a truncated polygonal pyramid, a hemisphere and a truncated hemisphere.

FIG. 8 illustrates the punch 44 having, as a forward end face thereof, a protruding section 66 in the form of a truncated cone. In this punch 44, a quantity of protrusion of the protruding section 66 is determined in such a manner that the recess is formed by the punch, the forward end face of which is formed flat, and the quantity of protrusion of the protruding section 66 is set at the same value as the quantity of protrusion of the formed recess which is protruded to the outside. Therefore, it is preferable that the quantity of protrusion which protrudes to the outside of the recess is previously measured.

According to the punch 44 shown in FIG. 8, when the second recess 36 is formed, a portion close to the center of the second recess 36 can be sufficiently moved to between the first recess 26 and the second recess 36. Therefore, the fluctuation of thickness of the bottom wall 38 forming the second recess 36 can be made as small as possible.

As mentioned above, the protruding section 66 formed on the forward end face of the punch 44 may have any desired form. FIG. 9 illustrates a punch 44 having a protruding section 68, the profile of which is a polygonal pyramid, in which (a) is a front view and (b) is a partial side view. This protruding section 68, can be produced more easily than the protruding section 66 in the form of a truncated cone shown in FIG. 8.

Figure 10:
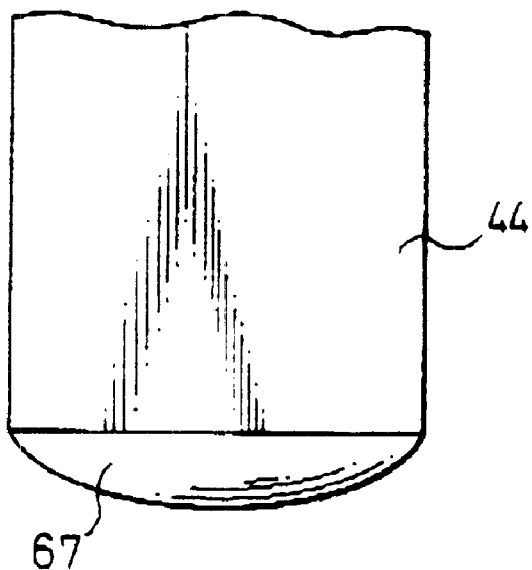
FIG. 10 is a partial side view illustrating another example of the punch used to solve the problem shown in FIG. 7.
Figure 11:
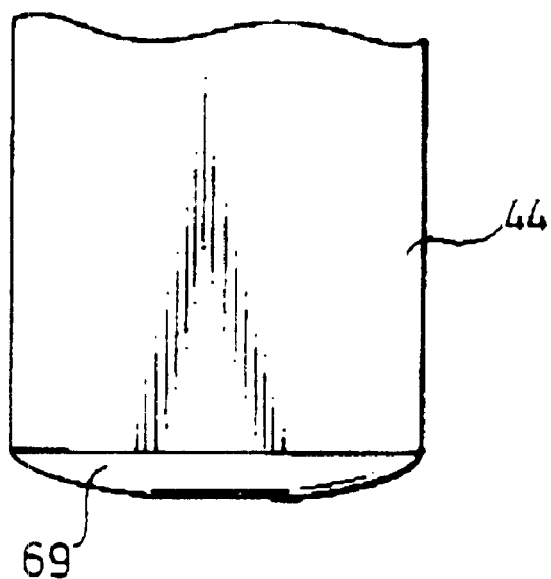
FIG. 11 is a partial side view illustrating still another example of the punch used to solve the problem shown in FIG. 7.

Further, FIG. 10 illustrates a punch 44 having on a forward end face thereof a protruding section 67 in the form of a hemisphere, and FIG. 11 illustrates a punch 44 having a protruding section 69 in the form of a truncated hemisphere. As in the protruding sections mentioned above, if these protruding sections are applied to the punch 44, the fluctuation of thickness of the bottom wall 38 forming the second recess 36 can be made as small as possible.

Furthermore, in these punches 44 having the specific protruding section shown in FIGS. 8 to 11, a bottom surface of the recess 48 formed in the die 50 of the second press die 40 is flat.

Figure 12:
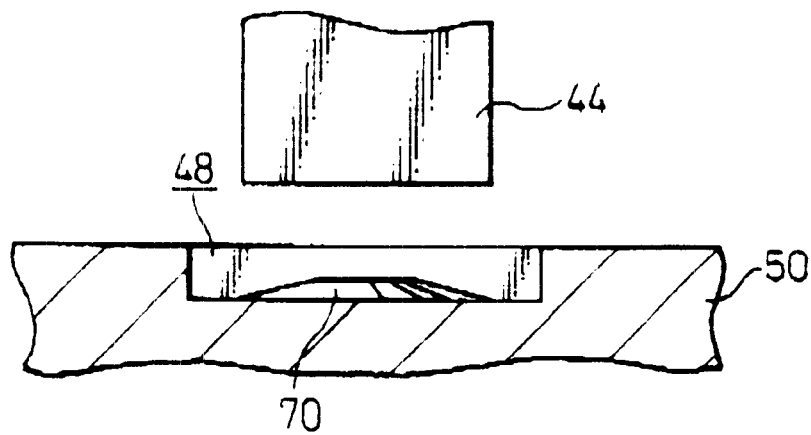
FIG. 12 is a partial cross-sectional view illustrating an example of the die used to solve the problem shown in FIG. 7.
Figure 13:
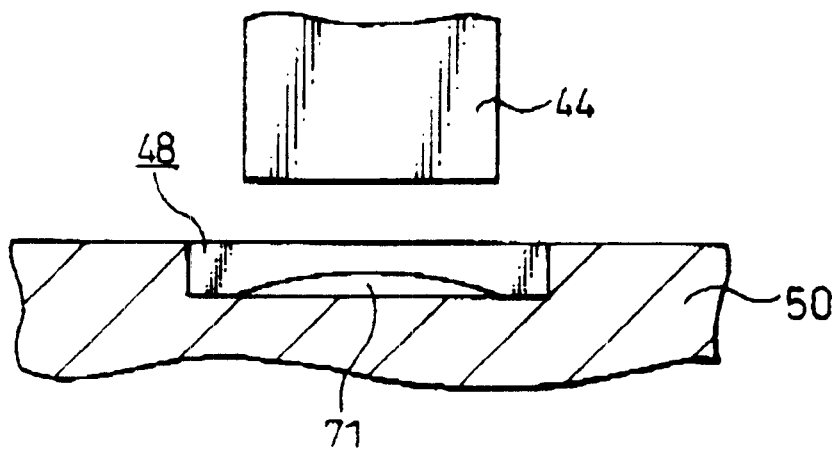
FIG. 13 is a partial cross-sectional view illustrating another example of the die used to solve the problem shown in FIG. 7.
Figure 14A:
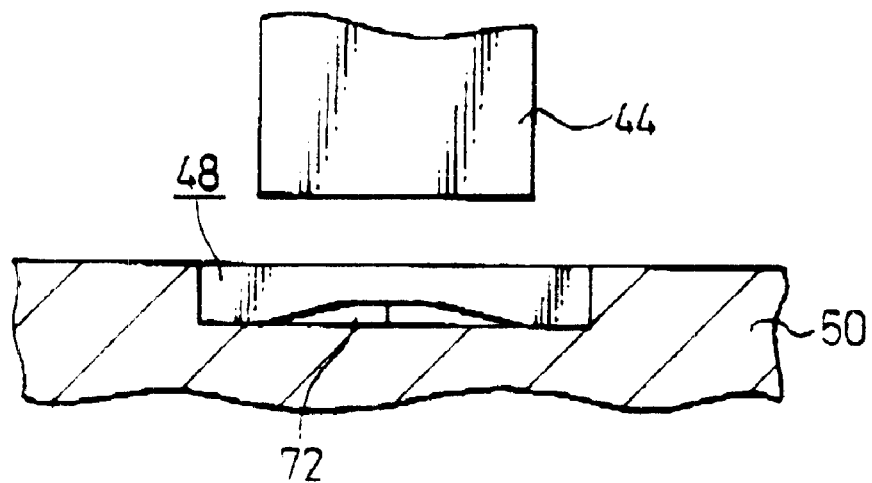
FIG. 14A is a partial cross-sectional view illustrating still another example of the die used to solve the problem shown in FIG. 7.
Figure 14B:
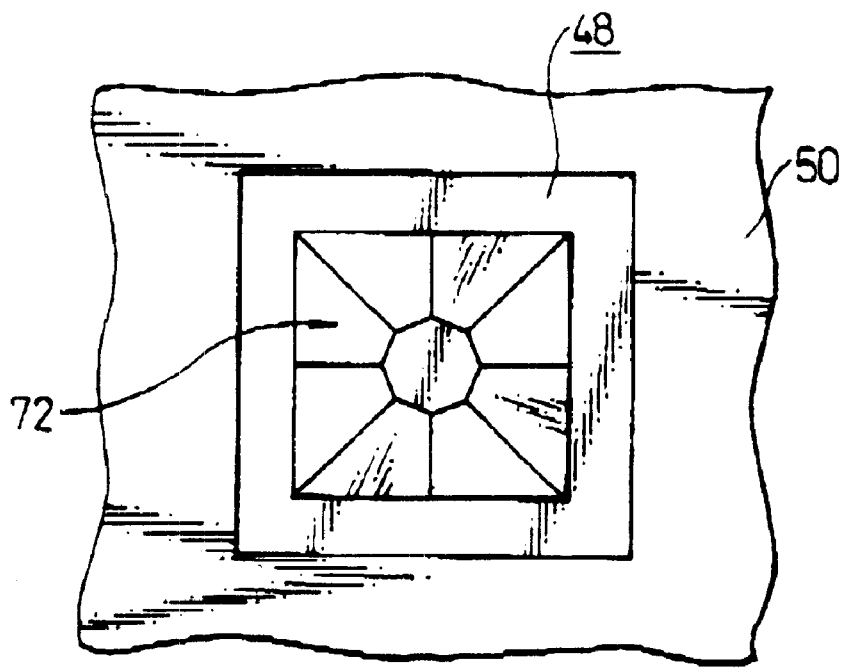
FIG. 14B is a partial front view of the die of FIG. 14A.

In the punch structures shown in FIGS. 8 and 11, the forward end face of the punch 44 was formed into a protruding section in the form of a truncated cone 66, a truncated polygonal pyramid 68, a hemisphere 67 or a truncated hemisphere 69. However, when the forward end face of the punch 44 is formed flat, the opposed face of the bottom face of the recess 48 formed in the die 50 may be formed into the protruding section 70 in the form of truncated cone shown in FIG. 12, the protruding section 71 in the form of hemisphere shown in FIG. 13 or the protruding section 72 in the form of truncated polygonal pyramid shown in FIG. 14. Note that FIG. 14 includes a partial cross-sectional view (14A) and a partial front view (14B) to make understanding the protruding section 72 easy. That is, even when the bottom face of the recess 48 formed in the die 50 has a truncated cone-like protruding section 70, a hemisphere-like protruding section 71 or a truncated polygonal pyramid-like protruding section 72, the fluctuation of thickness of the bottom wall 38 formed in the second recess 36 can be made as small as possible. Note that FIGS. 12 to 14 show only these examples, and, if desired, other protruding sections mentioned above such as a cone, a polygonal pyramid or a truncated hemisphere may be formed in the bottom face of the recess 48 in the die 50.

In the instances described above, a truncated cone-like, a truncated polygonal pyramid-like or a hemisphere-like protruding section and the like were applied to either of a forward end face of the punch 44 or a bottom face of the recess 48 in the die 50, however, if desired, such protruding sections may be formed in both the punch 44 and the recess 48. In such a case, the protruding sections may have the same configuration or different configurations.

The heat dissipation plate 10 shown in FIGS. 3A to 3C can be advantageously produced by using the production method described above with reference to FIGS. 4A to 4D and FIG. 5, however, it may be produced by using a modification of the above production method.

FIGS. 15A to 15D illustrates, in sequence, the production of a heat dissipation plate 10 shown in FIGS. 3A to 3D and having no flash in an upper corner section of the side wall 16. The production process until the step of FIG. 15A can be carried out by using the method similar to that illustrated in FIGS. 4A to 4C.

Figure 15A:
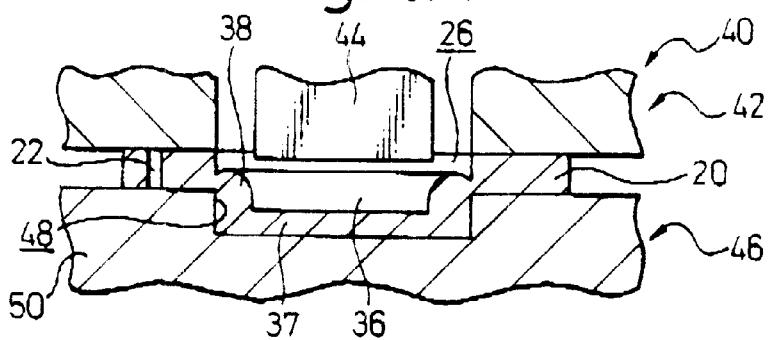
FIGS. 15A to 15D are cross-sectional view illustrating, in sequence, another embodiment of the manufacturing process of the heat dissipation plate shown in FIGS. 3A to 3C.
Figure 15B:
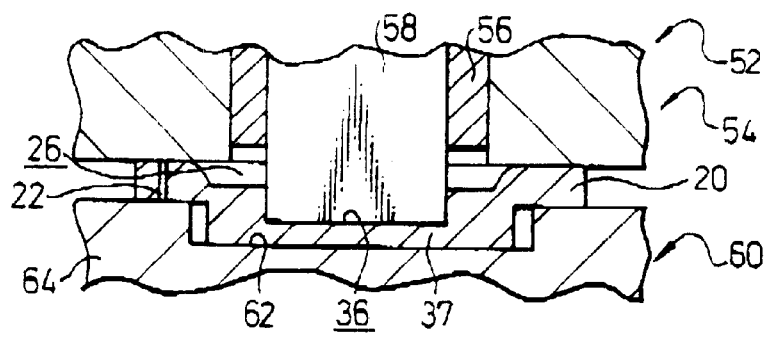

After a metallic plate 20 having a second recess 36 which has a cross section which is the same as the opening area of the recess 12 of the heat dissipation plate 10, and a protuberance portion 38 was formed in the step of FIG. 15A, in the step of FIG. 15B, the protuberance portion 38 is pressed to obtain a flat upper surface, while retaining a flatness of the inside and outside of the second recess 36. That is, according to this protuberance-flattening step, since the curved upper face of the protuberance section 38 is pressed by the forward end face of the cylindrical punch 56 while the forward end portion of the inserting body 58 of the upper die 54 is being inserted into the second recess 36, the bottom wall 37 of which is inserted into the recess 62 of the die 64 of the lower die 60 constituting the third press die 52, an upper surface of the protuberance section 38 is made flat. Further, since protrusion of the pressed portion of the protuberance section 38 to the inside and/or outside of the second recess 36 is prevented by the inserting body 58 of the upper die 52 inserted into the second recess 36 and also by the recess 62 of the die 64 provided in the lower die 60 into which the bottom wall 37 of the second recess 36 is inserted, it becomes possible to ensure the inside and outside of the second recess 36 flat.

Figure 15C:
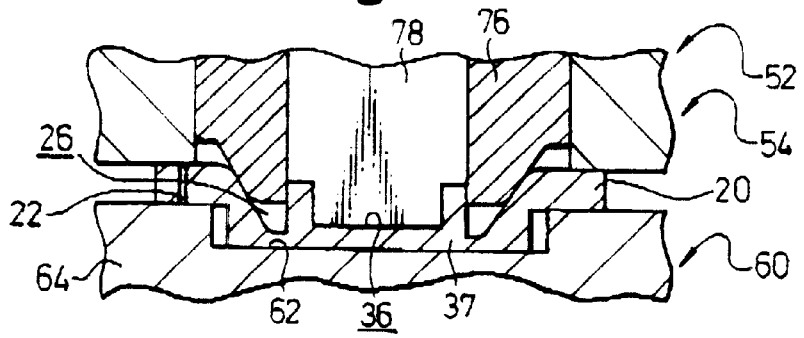

Then, in the step shown in FIG. 15C, the protuberance section 38 is pressed with a cylindrical punch 76 having a protrusion in a top surface thereof to form a groove, as illustrated, in the protuberance section 38. The groove has a function of reduce a thickness of the bottom wall 37 of the second recess 36 of the metallic plate 20 which will be subjected to punching in the subsequent profile formation step, thereby preventing flash formation during punching.

Figure 15D:
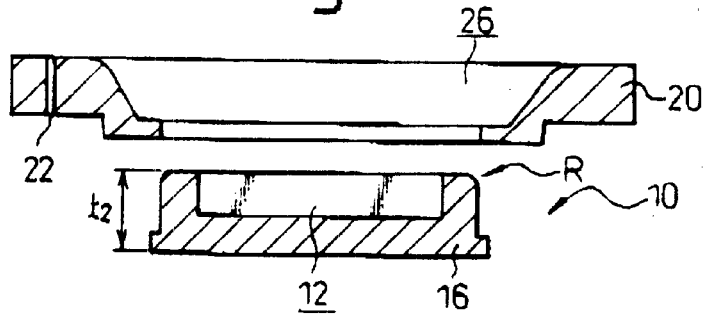

In the subsequent profile formation step shown in FIG. 15D, a metallic plate 20 having a flat upper surface in the protuberance section 38, formed between the first recess 26 and the second recess 36, is punched along with an outer side surface of the side wall 16 of the heat dissipation plate 10. In view of obtaining a high fabrication accuracy, it is preferred that the punching is carried out along with a cutting line (not shown) which is positioned slightly outer than the outer side surface of the side wall as is understood from FIG. 15D. The formation of a small projection in the lower end of the side wall 16 does not cause any problem in the practical use of the heat dissipation plate 10.

In the resulting heat dissipation plate 10, the side wall 16 has a round corner section in its outer end portion which is indicated with the arrow "R" in FIG. 15D. That is, according to the illustrated production process, the flash formation in such corner section can be effectively prevented, thereby avoiding a reduction of workability. It should be noted that if a thick metal plate 20 is punched with one punching step, the corner section "R" of the side wall 16 can easily produce sharp flashes which will be separated during production of semiconductor devices, thereby adversely affection the devices, or will reduce workability, in other words, to avoid these drawbacks, it was necessary to polish the corner section to remove the flashes therefrom. According to the production process of the present invention, such troublesome steps can be omitted from the production process, because punching is made in a thin bottom wall 37 of the metallic plate 20, and therefore no flash is produce in a corner section of the side wall 16 of the heat dissipation plate 10.

The cap-shaped heat dissipation plate 10 shown in FIGS. 3A to 3C may be advantageously produced in accordance with the method described, in sequence, referring to FIGS. 16A to 16D, in place of the methods illustrated in FIGS. 4A to 4D and FIG. 5, and in FIGS. 15A to 15D.

Figure 16A:
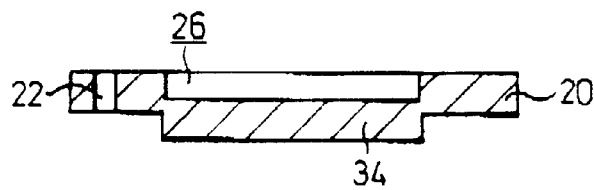
FIGS. 16A to 16D are cross-sectional views illustrating, in sequence, still another embodiment of the manufacturing process of the heat dissipation plate shown in FIGS. 3A to 3C.

After a metallic plate 20 was produced in accordance with the fabrication process similar to that illustrated in FIGS. 4A and 4B, as shown in FIG. 16A, a first recess 26, the area of which is larger than the opening area of the recess 12 of the heat dissipation plate 10 is formed along with a bottom wall 34. The thickness of the bottom wall 34 is substantially the same as that of the metallic plate 20 produced as the starting material.

Figure 16B:
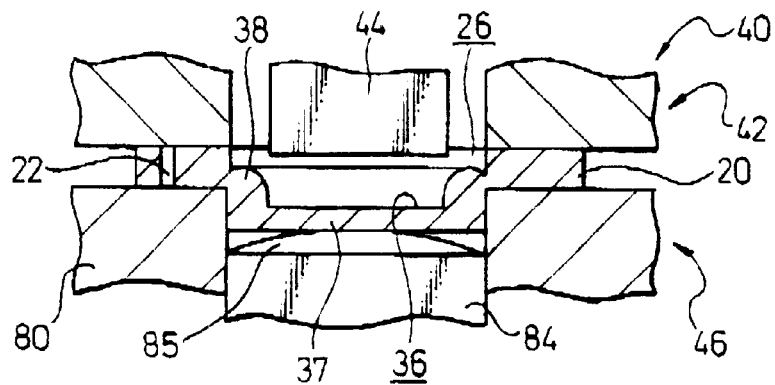

Next, as shown in FIG. 16B, a second recess 36 is formed in the bottom wall 34 of the first recess 26 formed on the metallic plate 20. The second recess 36 has the traverse cross section which is the same as the opening area of the recess 12 of the heat dissipation plate 10. When the thickness of the bottom wall 37 of the second recess 36 is made smaller than that of the bottom wall 34 of the first recess 26, the excluded metal of the bottom wall 34 is moved onto the bottom wall 34 of the first recess 26 between the first recess 26 and the second recess 36, so that a protuberance section 38 is formed. The thickness of the thus formed protuberance section 38 can be made larger than that of the metallic plate 20 as the starting material.

In the formation of the second recess 36, the metallic plate 20 may be elongated in the horizontal direction, but it can be absorbed by reducing the width of the slit 22.

The second recess 36 can be advantageously produced by using the second press die 40 shown in FIG. 16B. In the upper die 42 of the second press die 40, there is provided a second punch 44, the traverse cross section area of which is the same as the opening area of the recess 12 of the heat dissipation plate 10, and the traverse cross section of which is rectangular. In the lower die 46, on the face opposed to the forward end face of the second punch 44, there is provided a guide die 80 for guiding and supporting a protruding portion of the metallic plate 20 produced by the formation of the first recess 26, i.e., bottom wall 34 of the first recess 26, which is a protruding section protruding onto the side opposite to the opening face side of the first recess, and an insert 84 having, on a face opposed to a forward end face of the second punch 44, a protruding section 85 having a top portion in the form of a hemisphere. As illustrated, the insert 84 is positioned in a central hollow section of the guide die 80.

In the lower die, the guide die 80 has the functions to form a perpendicular side wall in the resulting recess 26, to prevent the warpage of the metallic plate 20 and increase the thickness of the protuberance portion 34 formed in the bottom wall 34, and the hemisphere-shaped protruding section 85 has the function to reduce the fluctuation of thickness of the bottom wall 38 defining the second recess 36 as much as possible. Note in the step shown in FIG. 16B that the insert 84 having a protruding section 85 in the form of hemisphere was used, however, if desired, the protruding section 85 may have other configurations such as a cone, a truncated cone, a polygonal pyramid, a truncated polygonal pyramid and a truncated hemisphere.

After the metallic plate 20 having a protuberance portion 38 was produced in accordance with the above-described manner, the protuberance portion 38 is flattened. Preferably, the flattening process can be carried out by pressing an upper surface of the protuberance portion 38 with a punch, while retaining a flatness of the inside and outside of the second recess 36.

Figure 16C:
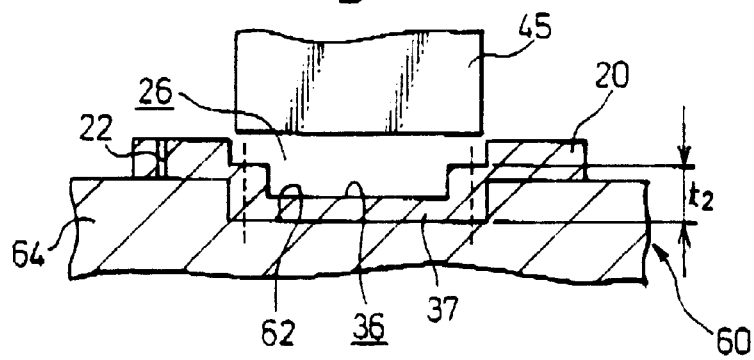

The flattening process of the protuberance portion 38 can be preferably carried out by using a press die shown in FIG. 16C. The illustrated press die comprises a cylindrical punch 45 for pressing the curved upper face of the protuberance section 38 so that the curved upper face can be flat and a lower die 60. In the lower die 60, there is provided a die 64 having the recess 62 into which the bottom wall 37, which is a protruding portion of the second recess 36, is inserted.

According to the above flattening process, a curved upper face of the protuberance portion 38 is pressed with a top surface of the cylindrical punch 45, while inserting the cylindrical punch 45 into the second recess 36, the bottom wall 37 of which is inserted into the recess 62 of the die 64 of the lower die 64, thereby making an upper face of the protuberance portion 38 flat along with production of the required thickness of $t_2$.

In this case, protrusion of the pressed portion of the protuberance section 38 to the inside and/or outside of the second recess 36 can be prevented by the cylindrical punch 45, inserted into the second recess 36, and the recess 62 of the die 64 provided in the lower die 60 into which the bottom wall 37 of the second recess 36 is inserted, and thus the inside and outside of the second recess 36 can be made flat.

Figure 16D:
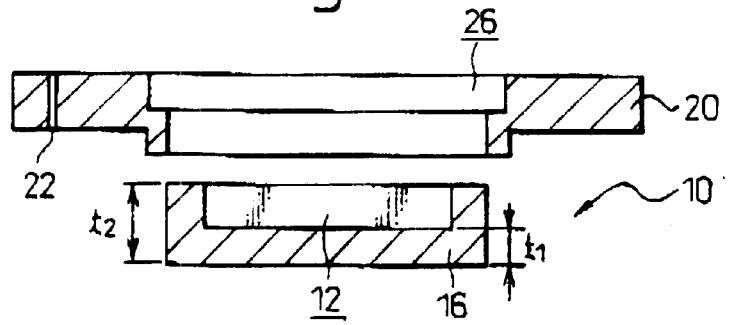

Thereafter, in the metallic plate 20 fabricated in the step shown in FIG. 16C, the resulting flat upper face of the protuberance portion is cut and separated at a cutting line, shown with a dotted line in FIG. 16C, to obtain the metallic plate 20 having the predetermined width. As shown in FIG. 16D, a cap-shaped heat dissipation plate 10 can be separated from the metallic plate 20 having the first recess 26.

In the resulting heat dissipation plate 10, the thickness $t_2$ between the upper end and the lower end of the side wall 16 of the recess 12 can be made larger than the thickness of the metallic plate 20 before press forming. Therefore, as the metallic plate 20, a metallic plate, the thickness of which is smaller than the thickness $t_2$, between the upper end and the lower end of the side wall 16 of the recess 12, can be used in the press forming, and thus the manufacturing cost of the heat dissipation plate 10 can be reduced.

Figure 17:
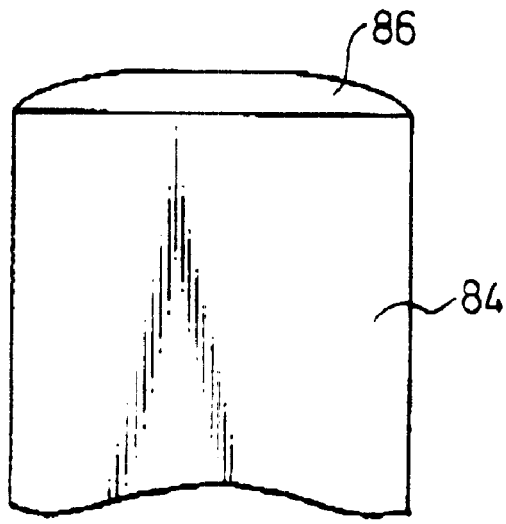
FIG. 17 is a partial cross-sectional view illustrating an example of the die used in the step of FIG. 16B.
Figure 18:
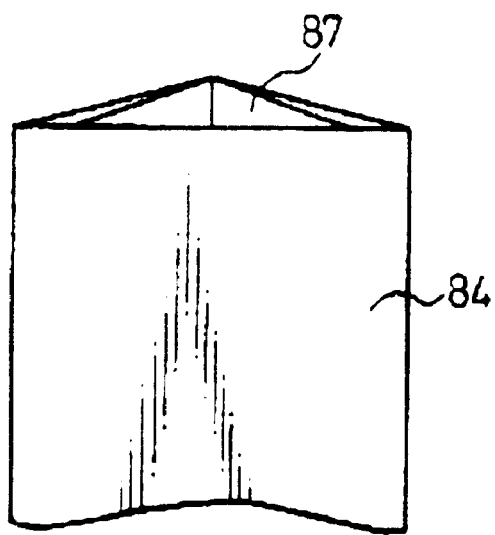
FIG. 18 is a partial cross-sectional view illustrating another example of the die used in the step of FIG. 16B.

As described above, an inert 84 having a protruding section 85 in the form of hemisphere was used in the process of FIG. 16B, however, if desired, any other insert may be used in place of the illustrated insert 84. FIG. 17 illustrates an insert 84 having a protruding section 86 in the form of a truncated hemisphere, and FIG. 18 illustrates an insert 84 having a protruding section 87 in the form of a polygonal pyramid. As a result of the combined use of the insert 84 having the specific protruding section with the second punch 44, it becomes possible to uniformly expand the metal in the bottom wall 37, along with prevention of the fluctuation in the thickness of same, contrary of the prior art molding process, based on the combined use of flat punch and flat die, according to which the metal cannot be uniformly extended in the bottom wall 37.

Figure 19:
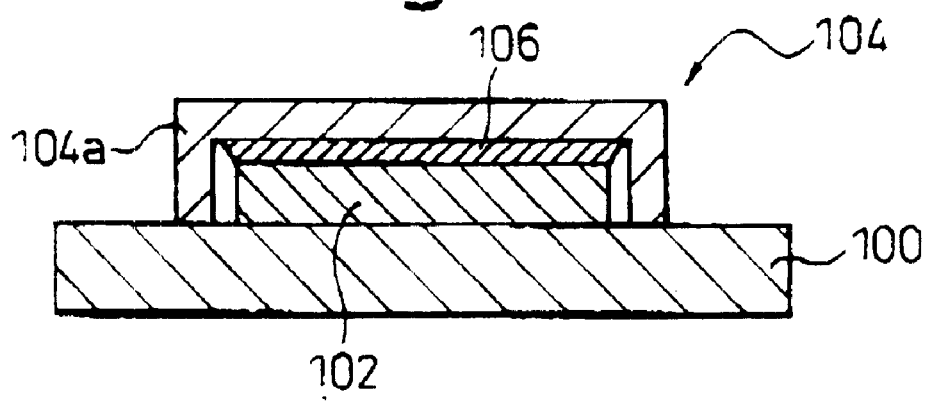
FIG. 19 is a cross-sectional view illustrating the plate-shaped member of the present invention, as a cap-shaped heat dissipation plate, attached to a semiconductor device.

FIG. 19 illustrates one application example of the plate-shaped member having a recess according to the present invention to a heat dissipation plate of a semiconductor device. In the illustrated semiconductor device, a cap-shaped heat dissipation plate 104 is applied and adhered through an adhesive layer 106 to a semiconductor element 102, such as an LSI, mounted on a wiring board 100.

In the wiring board 100, because a chip-type capacitor or other electronic parts may be mounted, along with the semiconductor element 102, it is required that both an inside surface and an outside surface of the cap-shaped heat dissipation plate 104 have a good flatness, and such requirement can be satisfied by the semiconductor device according to the present invention, because the cap-shaped heat dissipation plate 104 used therein has a highly flat inside and outside surfaces as a result of having no bending step of the metallic plate through press forming. Further, according to the present invention, as described above, the cap-shaped heat dissipation plate 104 having an exact configuration and size can be produced in accordance with the simple production method. Furthermore, according to the present invention, since no cutting process is used in the formation of a recess in the metallic plate, it becomes possible to not use a thick metallic plate, thereby reducing the production cost.

The above explanations have been made into the heat dissipation plate having the recess thereon. However, it should be noted that the present invention can be applied to a plate-shaped electronic part on which a recess is formed, for example, the present invention can be applied to a cap, for an electronic device or a general purpose part, having a recess. The press die used for manufacturing the above heat dissipation plate may be used as a press die for forming a recess, the area of the opening of which is large, on a metallic plate, in addition to the production of the heat dissipation plate.

As explained above, according to the present invention, a plate-shaped electronic part having a recess, defined by a bottom wall portion and a side wall portion extending from a peripheral end of the bottom wall portion, such as a heat dissipation plate, the upper and lower surfaces of the bottom wall portion and side wall portion being flat and in parallel, can be easily manufactured by means of press forming. Therefore, compared with a case in which the plate-shaped electronic part is manufactured by the conventional means of cutting, the manufacturing rate can be remarkably enhanced, and the thickness of the metallic plate to be worked can be reduced. Therefore, the manufacturing efficiency of a plate-shaped electronic part having a recess can be enhanced, along with reduction in the manufacturing cost.

What is claimed is:

1. A method of manufacturing a plate-shaped member having a recess, defined by a bottom wall portion and aside wall portion extending from a peripheral end of the bottom wall portion, by press forming a metallic plate without bending the same, which comprises the steps of:

press shaping a metallic plate by using a first punch to form a first recess, the opening area of which is larger than the opening area of the recess of the plate-shaped member;

forming a second recess in a bottom wall portion of the first recess by using a press die comprising a second punch, the cross-sectional area of which is equal to the opening area of the recess of the plate-shaped member, and a die having, on a face opposed to a forward end face of the second punch, a recess into which a protruding portion of the metallic plate produced by the formation of the first recess is inserted, while forming a protuberance portion in such a manner that the thickness of the bottom wall portion of the second recess is made to be smaller than the thickness of the bottom wall portion of the first recess, and the bottom wall portion of the first recess, between the first and the second recesses, is protruded so that the thickness between the upper surface and the lower surface of the protuberance portion can be larger than the thickness of the metallic plate;

forming an upper surface of the protuberance portion into a flat surface while retaining the flatness of the upper surface and lower surface of the side wall portion and the bottom wall portion defining the second recess and the thickness, between the upper surface and the lower surface, of the protuberance portion which is larger than the thickness of the metallic plate; and cutting the protuberance section to a predetermined width.

2. A method of manufacturing a plate-shaped member having a recess according to claim 1, wherein a side wall portion of the recess is formed after formation of a flat upper surface in the protuberance portion.

3. A method of manufacturing a plate-shaped member having a recess according to claim 1 or 2, wherein an absorbing portion such as a slit for absorbing an elongation created in the metallic plate during press forming is formed close to a portion, to which press forming is applied, of the metallic plate before forming the first recess in the metallic plate.

4. A method of manufacturing a plate-shaped member having a recess according to claim 1 or 2, wherein as the press die having the second punch and the die for forming the second recess, a press die is used in which at least one of the forward end face of the second punch and the opposed face of the die opposed to the forward end face of the second punch is formed into a protruding section of a cone, a truncated cone, a polygonal pyramid, a truncated polygonal pyramid, a hemisphere or a truncated hemisphere.

5. A method of manufacturing a plate-shaped member having a recess according to claim 1 or 2, wherein, as the press die having the second punch and the die for forming the second recess, a press die is used in which the die is a combination of a guide die for guiding and supporting a protruding portion produced by the formation of the first recess, and an insert having, on a face opposed to a forward end face of the second punch, a protruding section of a cone, a truncated cone, a polygonal pyramid, a truncated polygonal pyramid, a hemisphere or a truncated hemisphere, said insert being positioned in a central hollow portion of said guide die.

6. A method of manufacturing a plate-shaped member having a recess according to claim 1 or 2, wherein an upper surface of the protuberance portion is formed into a flat surface by using a press die which comprises an upper die having a cylindrical punch for making the curved upper surface of the protuberance portion flat and an inserting body, a forward end portion of which inserted into the second recess, and a lower die having a recess into which the bottom wall portion which is a protruding portion of the second recess is inserted.

7. A method of manufacturing a plate-shaped member having a recess according to claim 1 or 2, wherein an upper surface of the protuberance portion is formed into a flat surface by the flat pressing a curved upper surface of the protuberance portion with a cylindrical punch.

8. A method of manufacturing a plate-shaped member having a recess according to claim 1 or 2, wherein said metallic plate is a plate made of copper, a copper alloy, stainless steel, aluminum or an aluminum alloy.

9. A press die for forming a recess in a metallic plate in the production of a plate-shaped member having a recess, defined by a bottom wall portion and a side wall portion extending from a peripheral end of the bottom wall portion, which press die comprises a punch for forming a recess on the metallic plate by press forming and a die opposed to the punch, the metallic plate being put on said die opposed to the punch for forming a recess in the metallic plate, wherein the die opposed to the punch comprises a combination of a guide die for guiding and supporting a protruding portion produced by the formation of the recess, and an insert having, on a face opposed to a forward end face of the punch, a protruding section of a cone, a truncated cone, a polygonal pyramid, a truncated polygonal pyramid, a hemisphere or a truncated hemisphere, said insert being positioned in a central hollow portion of said guide die.

\* \* \* \* \*